United States Patent Office 3,773,800
Patented Nov. 20, 1973

3,773,800
PROCESS FOR THE PRODUCTION OF
1,5-DIHYDROXYANTHRAQUINONE
Rudolf Winkler, Reinach, Basel-Land, Switzerland,
assignor to Sandoz Ltd., Basel, Switzerland
No Drawing. Filed Feb. 9, 1971, Ser. No. 114,056
Int. Cl. C09b 1/04
U.S. Cl. 260—383   7 Claims

ABSTRACT OF THE DISCLOSURE

The invention is concerned with the manufacture of 1,5-dihydroxyanthraquinone by the condensation of m-hydroxybenzoic acid in an aluminum chloride-sodium chloride melt.

---

1,5-dihydroxyanthraquinone (anthrarufin) is manufactured on a bulk scale from anthraquinone. Since coal tar is being gradually superseded by petroleum as a source of starting materials for the chemical industry, a considerable degree of interest exists in a technically simple and economical synthesis of anthrarufin from benzene derivatives.

It has been found that anthrarufin can be obtained in good yield by condensing meta-hydroxybenzoic acid with heating in a melt of aluminum chloride and sodium chloride.

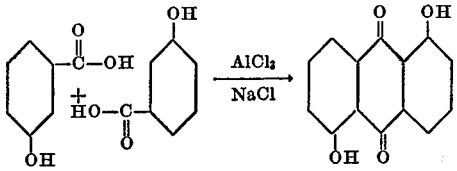

The condensation of meta-hydroxybenzoic acid in the gaseous or vapour phase or with the aid of sulphuric acid is known, but the product obtained is predominantly 2,6-dihydroxyanthraquinone.

Further, it is known (German Pat. 87,620) that dimethyldihydroxyanthraquinone can be produced from meta-hydroxy-α-toluic acid in a tin chloride melt. However, when this process is used for the condensation of meta-hydroxybenzoic acid, it provides at most only 50% of the yield obtained from the process of the present invention.

In general, amounts of about 0.16 to 0.18 part by weight of sodium chloride to 1 part by weight of aluminum chloride and 7 to 9 parts by weight of aluminum chloride to 1 part of meta-hydroxybenzoic acid are reacted. At temperatures below 150° C. the rate of reaction is too slow for bulk manufacture, while above 220° C. the yield falls off because of side-reactions. The optimum temperature range is between 170° C. and 210° C. The condensation is best conducted under nitrogen or in an inert atmosphere. The anthrarufin formed is isolated in a normal manner, e.g. by diluting the cooled melt with dilute mineral acid solution. The aqueous suspension of anthrarufin thus obtained can be filtered without further cooling.

EXAMPLE 1

170 parts of meta-hydroxybenzoic acid in 1320 parts of aluminum chloride and 230 parts of sodium chloride under nitrogen are maintained for 4 hours at 170–180° C. and for the next 6 hours at 200–210° C. After this time the meta-hydroxybenzoic acid has almost completely disappeared. When the melt has cooled, 5000 parts of dilute hydrochloric acid are stirred into it, then the temperature is raised and the product filtered in the heated state, washed until neutral and dried. 130 parts (90% of theory) of crude anthrarufin are obtained. It can be purified by extraction with glacial acetic acid. The yield of pure anthrarufin is 90 parts (70% of theory).

The parts specified in this example are parts by weight.

EXAMPLE 2

The procedure of Example 1 is employed using, however, 270 parts of sodium chloride. The yield of crude anthrarufin is 110 parts, from which about 85 parts of the pure product can be obtained.

EXAMPLE 3

Proceeding as in Example 1 but with 600 parts of aluminum chloride and 116 parts of sodium chloride, crude anthrarufin is obtained in a yield of 90 parts.

EXAMPLE 4

The procedure of Example 1 is followed but condensation is carried out for 16 hours at 150–160° C. The crude anthrarufin is obtained in a yield of 110 parts, from which 75 parts of the pure product are obtained.

EXAMPLE 5

Employing again the procedure of Example 1, condensation is carried out for 4 hours at 180° C. and then for 6 hours at 220–225° C., which yields 130 parts of crude anthrarufin, from which, however, only about 65 parts of the pure product are obtained.

Having thus disclosed the invention what I claim is:

1. A process for producing 1,5-dihydroxyanthraquinone by condensing meta-hydroxybenzoic acid, the process being characterized by heating the meta-hydroxybenzoic acid in an aluminum chloride-sodium chloride melt.

2. A process according to claim 1 wherein the melt has a weight ratio of from 0.16 to 0.18 part of NaCl to 1 part of AlCl$_3$.

3. A process according to claim 2 wherein the aluminum chloride is present in the melt in an amount of from 7 to 9 parts by weight per part by weight of the meta-hydroxybenzoic acid.

4. A process according to claim 1 wherein the melt is maitained at a temperature between 150° C. and 220° C.

5. A process according to claim 1 which is effected at a temperature between 170° C. and 210° C.

6. A process according to claim 1 which is effected in an inert atmosphere.

7. A process for obtaining a good yield of anthrarufin by condensing meta-hydroxybenzoic acid and which is characterized by condensing the meta-hydroxybenzoic acid at a temperature of at most 220° C. in a melt of aluminum chloride and sodium chloride.

References Cited

FOREIGN PATENTS

| 87,620 | 1894 | Germany | 260—383 |
| 605,446 | 1934 | Germany | 260—383 |

OTHER REFERENCES

Fieser et al., Reagents for Organic Synthesis, pp. 1027–9 (1968).

LORRAINE H. WEINBERGER, Primary Examiner

R. GERSTL, Assistant Examiner

UNITED STATES PATENT OFFICE
CERTIFICATE OF CORRECTION

Patent No. 3,773,800  Dated November 20, 1973

Inventor(s) Rudolf Winkler Reinach

It is certified that error appears in the above-identified patent and that said Letters Patent are hereby corrected as shown below:

Column 1, after line 5, insert -- Claims priority, Switzerland Application No. 2995/70, Filed March 2, 1970. --.

Signed and sealed this 3rd day of December 1974.

(SEAL)
Attest:

McCOY M. GIBSON JR.
Attesting Officer

C. MARSHALL DANN
Commissioner of Patents